C. W. STARKER.
DYNAMO ELECTRIC MACHINE.
APPLICATION FILED APR. 1, 1915.

1,209,776.

Patented Dec. 26, 1916.

WITNESSES:

INVENTOR
Charles W. Starker.
BY
ATTORNEY

UNITED STATES PATENT OFFICE.

CHARLES W. STARKER, OF PITTSBURGH, PENNSYLVANIA, ASSIGNOR TO WESTINGHOUSE ELECTRIC AND MANUFACTURING COMPANY, A CORPORATION OF PENNSYLVANIA.

DYNAMO-ELECTRIC MACHINE.

1,209,776.  Specification of Letters Patent.  Patented Dec. 26, 1916.

Application filed April 1, 1915. Serial No. 18,480.

*To all whom it may concern:*

Be it known that I, CHARLES W. STARKER, a subject of the Emperor of Germany, and a resident of Pittsburgh, in the county Allegheny and State of Pennsylvania, have invented a new and useful Improvement in Dynamo-Electric Machines, of which the following is a specification.

My invention relates to dynamo-electric machines, and it has special reference to the structural features of frames for electric railway motors and the like.

One of the objects of my invention is to provide a device of the above indicated-character which shall be relatively simple and inexpensive, of relatively light weight, but rugged and durable in construction.

More specifically stated, it is the object of my invention to provide a motor frame of the split type which shall embody certain manufacturing and assembling advantages that are inherent in pressed metal construction and that are familiar to those skilled in the art.

In my co-pending application, Serial No. 860,974, filed September 10, 1914, is shown and described a pressed-steel motor of the box or solid-frame type.

According to my present invention, I disclose certain forms of a split-frame type of motor which it is desirable or preferable to use in many cases.

The advantages of pressed-steel construction of dynamo-electric machine frames over the usual cast steel or iron type of frame may be summarized as follows: The weight of a machine is materially decreased by the use of pressed steel, thereby reducing the operating expense for carrying dead weight in an electric railway vehicle, for example, and lessening the cost of track maintenance. The weights and overall dimensions of equally-rated motors may be maintained constant and accurate, thereby insuring definite and exactly similar performance of all the motors, in particular, the motor speed, thus securing a uniform distribution of current to, and heating of, the motors of the same vehicle or train. From another view-point, the size of a motor for a predetermined output may be considerably decreased if pressed-steel parts are employed, thereby permitting the use of motors of larger capacities in the crowded spaces beneath the vehicle floors or a reduction in the floor height as well as in the size and weight of the wheels.

Figure 1:
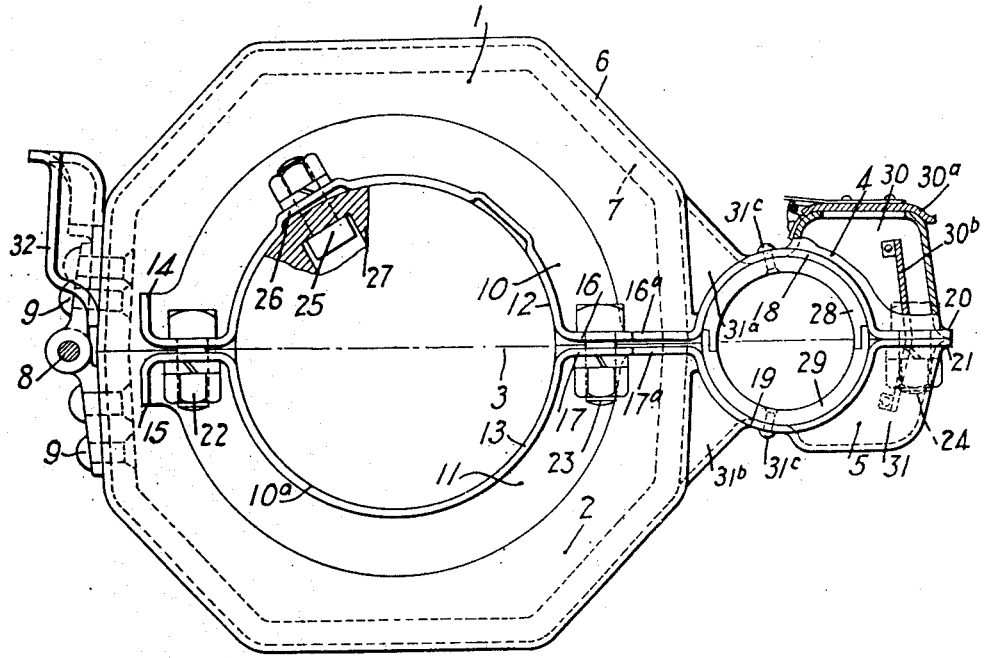
Figure 2:
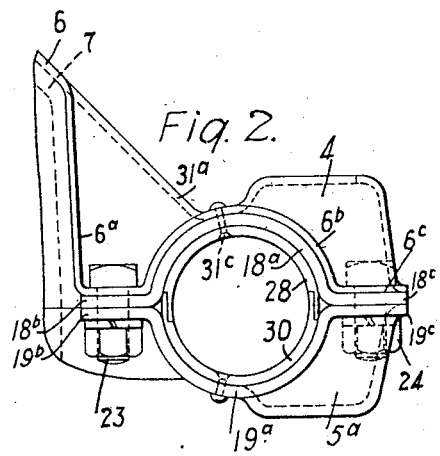

In the accompanying drawing, Figure 1 is a view, in end elevation, of a motor frame constructed in accordance with my invention; and Fig. 2 is a fragmentary view, in end elevation, showing a modification of the structure illustrated in Fig. 1.

Referring to the drawing, the structure here shown comprises upper and lower complementary incasing members 1 and 2, respectively, that meet along a substantially central plane 3; an axle bracket 4 and a corresponding axle cap 5.

The main incasing members 1 and 2 severally comprise a split-type shell or outer cover 6 of pressed steel or other suitable pressed material and a magnetizable yoke or band 7 that is disposed within the shell 6 and is also split along the horizontal plane 3. The purpose of this magnetizable yoke is to form a section of the main magnetic circuit, whereby the outer shell 6 may be of relatively small cross-section that is sufficient for the purposes of mechanical strength only, although the shell members will also preferably be included in the magnetic circuit, as more fully set forth in my above-identified specification. The main incasing members 1 and 2 are preferably hinged together at one side by one or more suitable hinge members 8 that may be secured to the respective incasing members by a plurality of bolts 9. A pair of semi-annular bands 10 and 11, respectively having longitudinally-extending lips 12 and 13, are suitably secured, as by bolts, rivets or spot-welding, to the incasing members 1 and 2 to surround the usual end openings 10$^a$ in the motor frame, for a purpose to be described. The ends 14 and 15 of the lips 12 and 13 are respectively bent upwardly and downwardly near one side of the frame to form suitable pockets for the reception of bolts or other suitable clamping means. Near the other side of the frame, the lips respectively terminate in oppositely-disposed straight portions 16 and 17 for a similar reception of bolts. From this point, the respective lips are continued through straight portions 16$^a$ and 17$^a$ and semi-cylindrical portions 18 and 19 that are respectively associated with the axle bracket 4 and axle cap 5, and finally, through oppositely-disposed straight end-portions 20 and 21 at the outerside of the axle-inclosing members.

For detachably securing the parts of the motor frame together, one or more bolts 22 extend through the lips 12 and 13 within the pockets above referred to that are formed by the bent ends 14 and 15, and other bolts 23 extend through the straight portions 16 and 17 of the lips. One or more bolts 24 extend through the straight portions 20 and 21 near either one or both ends of the axle-inclosing members for detachably securing the corresponding sides of the motor frame together.

The axle bracket 4 and the axle cap 5 are shown as formed integrally with the main incasing members 1 and 2, respectively, whereby the complete upper and lower portions of the frame are substantially identical. In a co-pending application, Serial No. 18,479, filed of even date herewith, is shown and described a plurality of axle-inclosing members that are substantially detachably secured to one or more of the main incasing members.

A plurality of bolts 25 severally extend through seats 26 of the lip 12 for the purpose of securing a suitable bearing-housing to the main incasing member 1. Inasmuch as the particular type of bearing-housing employed is not essential to my present invention, such housing is simply conventionally illustrated at 27, and no further showing is deemed necessary.

A pair of suitable coöperating bearing members 28 and 29 are preferably respectively disposed within the semi-cylindrical portions 18 and 19 of the axle-inclosing members 4 and 5, in accordance with customary practice. The axle bracket 4 and the axle cap 5 are also preferably provided with integrally formed boxes or chambers 30 and 31 for the purpose of containing suitable lubricating material for use in connection with the bearing members 28 and 29.

The upper chamber 30 is provided with a top opening having a suitable cover-member $30^a$, and a longitudinally-extending suitably-split partition member $30^b$ is preferably employed for the familiar purpose of providing an oil-gaging well and a contiguous receptacle for waste, or other suitable distributer of lubricating material. The frame portions $31^a$ and $31^b$ that are disposed adjacent to the axle-inclosing members 4 and 5 are suitably fashioned to receive one or more rivets $31^c$ that may serve to secure the bearing members 28 and 29 to the portions 18 and $31^a$, and 19 $31^b$, respectively, for the purpose of preventing an undesirable spread of lubricant.

As a means of supporting the motor frame on the side remote from the axle-inclosing members, a suspension bar 32 of any suitable form may be employed, being shown as secured to the main incasing member 1 near the hinge members 8.

Reference may now be had to the modified construction illustrated in Fig. 2, wherein the axle-bracket 4 is shown as formed integrally with the main incasing member 1, while an axle cap $5^a$ is shown as detachably secured to the axle bracket by means of bolts 23 and 24, in a manner to be set forth.

The outer shell member 6 is provided, near the axle bracket 4, with a downwardly-extending rib or web member $6^a$, a continuation of which is adapted to form a pocket for the reception of the bolt 23 and then forms a semi-cylindrical portion $6^b$ for inclosing the semi-cylindrical portion $18^a$ of the axle bracket 4 that corresponds to the portion 18 of the structure shown in Fig. 1.

The semi-cylindrical portion $18^a$ of the axle bracket and the lower complementary member $19^a$ of the axle cap are respectively provided with straight outer end-portions $18^c$ and $19^c$ and inner end-portions $18^b$ and $19^b$. The semi-circular portion $6^b$ terminates in a straight end-portion $6^c$ that is disposed in vertical alinement with the end-portions $18^c$ and $19^c$, the bolt or bolts 24 extending through these three end-portions for suitably clamping the axle bracket 4 and the axle cap $5^a$ together at either one or both ends thereof. The bolt 23 is disposed within the pocket formed between the members $6^a$ and $6^b$ and serves to clamp the inner end-portions $18^b$ and $19^b$ of the axle-inclosed member to the web member $6^a$. The bearing members 28 and 30 may be secured to the portion $31^a$ of the frame and the upper semi-circular portion $6^b$ of the axle cap and to the lower semi-circular portion $19^a$, respectively, by means of a plurality of the rivets $31^c$.

Although not shown in Fig. 2, it should be understood that the axle-inclosing members are preferably provided with the cover-member $30^a$ and the partition member $30^b$, as illustrated in Fig. 1. It will be observed that, by removing the bolts 23 and 24, the axle cap $5^a$ may readily be removed.

Obviously, various other modifications of my invention may be made without departing from the spirit and scope thereof, and I desire, therefore, that only such limitations shall be imposed as are indicated in the appended claims.

I claim as my invention:

1. A pressed-steel incasing member of the split type for dynamo-electric machines comprising a split axle-inclosing member, at least one part of said last member being integrally formed with the corresponding part of said incasing member.

2. A frame for dynamo-electric machines comprising a peripherally disposed split magnetizable member and a correspondingly split-incasing member and axle-inclosing member, at least one part of said last member being integrally formed with the corresponding part of said incasing member.

3. A frame for dynamo-electric machines comprising a peripherally disposed split magnetizable band of relatively large cross-section and a correspondingly split pressed-steel incasing member and axle-inclosing member, at least one part of said last member being integrally formed with the corresponding part of said incasing member.

4. A dynamo-electric machine frame of the split type, the frame parts respectively embodying an integrally formed axle bracket and axle cap.

5. A dynamo-electric machine frame of the split type, the frame parts being substantially identical and respectively embodying an integrally formed axle bracket and axle cap.

6. A pressed-steel incasing member for dynamo-electric machines comprising two substantially identical parts respectively embodying and integrally formed axle bracket and axle cap.

7. A frame for dynamo-electric machines comprising a peripherally disposed split magnetizable band and a correspondingly split pressed-steel incasing member, the parts thereof respectively embodying an integrally formed axle-bracket and axle cap.

8. A pressed-steel split incasing member for dynamo-electric machines having one part of an axle-inclosing member integrally formed with one of the incasing member parts and a complementary axle-inclosing part detachably secured to said incasing member and to said first axle-inclosing part.

9. A pressed-steel split incasing member for dynamo-electric machines having an axle bracket integrally formed with the upper part of the incasing member and an axle cap detachably secured to said bracket and to said upper part.

10. A pressed-steel incasing member of the split type for dynamo-electric machines comprising an axle-inclosing member split in alinement with the main frame members, at least one part of said last member being integrally formed with the corresponding part of said incasing member.

In testimony whereof, I have hereunto subscribed my name this 30th day of March, 1915.

CHARLES W. STARKER.

Copies of this patent may be obtained for five cents each, by addressing the "Commissioner of Patents. Washington, D. C."